(12) United States Patent
Park et al.

(10) Patent No.: US 6,452,716 B1
(45) Date of Patent: Sep. 17, 2002

(54) AMPLITUDE MODULATION OF A PUMP LASER SIGNAL IN A DISTRIBUTED RAMAN AMPLIFIER

(75) Inventors: David W. Park, Kanata (CA); Christopher R S Fludger, Cambridge; Vincent A. Handerek, Grays, both of (GB)

(73) Assignee: Nortel Networks Limited, St. Laurent (CA)

( * ) Notice: Subject to any disclaimer, the term of this patent is extended or adjusted under 35 U.S.C. 154(b) by 5 days.

(21) Appl. No.: 09/679,389

(22) Filed: Oct. 5, 2000

(51) Int. Cl.[7] .............................................. G01M 11/02
(52) U.S. Cl. ..................................................... 359/334
(58) Field of Search ................................ 359/334; 372/3

(56) References Cited

U.S. PATENT DOCUMENTS

| | | | |
|---|---|---|---|
| 5,598,289 A | * | 1/1997 | Watanabe ..................... 359/173 |
| 5,883,736 A | | 3/1999 | Oshima et al. ................ 359/341 |
| 5,917,179 A | * | 6/1999 | Yao ......................... 250/227.11 |
| 6,052,219 A | | 4/2000 | Kidorf et al. ................. 359/334 |
| 6,178,036 B1 | * | 1/2001 | Yao ............................. 359/334 |
| 6,188,508 B1 | * | 2/2001 | Horiuchi et al. ............. 359/334 |

FOREIGN PATENT DOCUMENTS

JP          02238339 A   *  9/1990  .......... G01M/11/02

OTHER PUBLICATIONS

Dianov et al., "Highly efficient 1.3 micrometer Raman Fibre amplifier", 1998, Electronics Letters, vol. 34, No. 7, pp. 669–670.*

Izumita et al. "1.65nm Brillouin Optical Time Domain Reflectometry employing a Raman fiber amplifier and a lithium niobate phase–modulator", Optical Fiber Communication, Feb. 16–21, 1997, pp. 159–160.*

* cited by examiner

Primary Examiner—Thomas H. Tarcza
Assistant Examiner—Deandra M. Hughes (57) ABSTRACT

A power supply for a pump laser in a distributed Raman amplifier is modulated with a small amount of amplitude modulation. This amplitude modulation transfers to the traffic wavelengths and is detected at a Raman amplifier control system. The Raman amplifier control system decodes the modulation and determines the amount of modulation transferred to the traffic. Given knowledge of the signal level of the modulation that was applied the gain of the distributed Raman amplifier may be determined. The Raman amplifier control system may then control the power supplied to the pump laser to result in a specific gain, thus providing closed loop control.

15 Claims, 6 Drawing Sheets

AMPLITUDE MODULATION OF A PUMP LASER SIGNAL IN A DISTRIBUTED RAMAN AMPLIFIER

FIELD OF THE INVENTION

The present invention relates to optical communication systems and, more particularly, to amplitude modulation of a pump laser signal in a distributed Raman amplifier.

BACKGROUND OF THE INVENTION

Optical communication systems use optical fiber as a communication medium and light as an information carrier. For instance, an optical signal may be a beam of light modulated to represent binary-coded information. When light is used to transmit information, the information may be extracted from the beam of light through the use of a photodetector in a receiver. A photodetector is an electronic component that detects the presence of light radiation through conversion of light energy to electrical energy. A common photodetector is called a photodiode which consists of a semiconductor having a property called photoconductivity, in which the electrical conductance varies depending on the intensity of radiation striking the semiconductor material comprising the photodiode. Essentially, a photodiode is the same as an ordinary diode, except that the package has some transparency that allows light energy to effect junctions between the semiconductor materials inside.

To make efficient use of a single optical fiber, many unique data signals may be transmitted over the same fiber so long as each data signal modulates an optical signal with a wavelength different from the other optical signals on the same fiber. When the wavelengths of the different optical signals are only marginally different from one another, the transmission scheme may be called Dense Wavelength Division Multiplexing (DWDM). In a network using DWDM, two elements connected by a single physical link (optical fiber) may communicate using a number of signal channels, where each signal channel is an optical signal with a distinct wavelength.

One detrimental factor to be considered in optical communication is attenuation. Essentially, signal power is attenuated over the length of a fiber such that the power of a signal at the receiving end of a transmission link is less than the power of the signal at the sending end of the transmission link. To overcome attenuation, a long optical transmission link may be made up of several shorter spans. At a repeater at the beginning of each span after the first, the optical signal is received and subsequently regenerated at a power level that will allow accurate reception at the end of the span. Unfortunately, these repeaters require that the optical signal be converted to an electrical signal and this conversion has several inherent drawbacks.

Fortunately, equipment that amplifies the optical signal without converting it to an electrical signal has been developed, one example of which is the Erbium Doped Fiber Amplifier (EDFA). The idea behind an EDFA is that if a fiber is doped (enhanced) with Erbium, and a signal from an external light source (for instance, a laser) is used to excite the Erbium, the power of an optical signal passing through the fiber will be increased.

Rather than amplify an optical signal in an amplifier, distributed amplification is possible wherein part of the transmission fiber acts as an amplifier. One such distributed amplification scheme is called "Raman amplification" wherein high-power laser light is sent (or pumped) on the same transmission fiber as the data signal. Raman amplification is named after the scientist who discovered a phenomenon in the scattering of light, called the Raman Effect, in 1928. Raman amplification takes advantage of stimulated Raman scattering, which occurs in a silica fiber when an intense pump laser beam propagates through it. Stimulated Raman scattering is an inelastic scattering process in which an incident pump photon loses its energy to create another photon of reduced energy at a lower frequency. That is, pump energy of a given wavelength amplifies, or provides gain to, a signal at a longer wavelength. To date, distributed Raman amplification is an open loop process where the pump powers, but not the gain, may be controlled.

Various measures of quality exist for measuring the operation of optical systems. The term "Q" may used to describe the "quality" of a particular optical transmission system in terms of the eye opening when a digital signal is transmitted over the particular optical transmission system. Additionally, the term "OSNR" may be used to describe an optical signal-to-noise ratio present in a given optical system.

For a particular span, the qualities of the transmitter, the medium and the receiver may be summarized in a single number, called a "link budget". The link budget represents the amount of allowable attenuation of a signal over the span, say 30 dB. If an ancillary component is included in a span, for instance for service channel transmission, additional attenuation may be introduced. If a component reduces signal power by one dB, the link budget would then be 29 dB. The one dB reduction in link budget is called a "link budget penalty".

With knowledge of the traffic signal at the input and output of a distributed Raman amplifier, the gain of the amplifier is relatively straightforward to determine. However, often the traffic signal is not available to the operator of such an amplifier. Clearly, it would be desirable to have closed loop control of the Raman amplification process in the transmission fiber in the absence of access to the input signal.

SUMMARY OF THE INVENTION

A pump laser signal in a distributed Raman amplifier, which includes a length of transmission fiber and a pump laser, is modulated with a small amount of amplitude modulation. This amplitude modulation transfers to the traffic wavelengths and is detected at a Raman amplifier control system. The Raman amplifier control system, given knowledge of the received modulation and the applied modulation, may determine the gain of the distributed Raman amplifier. The Raman amplifier control system may then control the power supplied to the pump laser to result in a specific gain, thus providing closed loop gain control. Control of the gain of the distributed Raman amplifier results in more accurate control of the signal at the output of the distributed Raman amplifier. Advantageously, more accurate control of the output signal level leads to improved optical link budgets, which translates into better control of Q or OSNR.

In another aspects of the invention, an increase in determined gain may allow a determination of any increase in reflection caused by optical components at the far end of the length of transmission fiber. Further, the amplitude modulation may allow a receiver to identify a particular pump laser signal. This may assist in a determination of a power loss over the length of the optical transmission fiber.

In accordance with an aspect of the present invention there is provided a method for facilitating determination of a characteristic of an optical signal on an optical fiber, including amplitude modulating a pump laser signal of a distributed Raman amplifier.

In accordance with another aspect of the present invention there is provided a method for facilitating determination of a characteristic of an optical signal on an optical fiber. The method includes identifying a particular pump laser signal of a distributed Raman amplifier from amplitude modulation of the particular pump laser signal, measuring a power of the particular pump laser signal, receiving an indication of transmitted power in the particular pump laser signal and determining a power loss from the indication of transmitted power and a power determined from the measuring the power of the particular pump laser signal.

In accordance with a further aspect of the present invention there is provided a method of monitoring gain in a distributed Raman amplifier, where the distributed Raman amplifier includes a length of transmission fiber and a pump laser. The method includes receiving an indication of amplitude modulation applied to a pump laser signal of the distributed Raman amplifier, receiving an indication of amplitude modulation output from the distributed Raman amplifier and determining a gain from the indication of amplitude modulation applied and the indication of amplitude modulation output. In another aspect of the invention a gain monitoring system and a pump power controller are provided for performing this method. In a further aspect of the present invention, there is provided a software medium that permits a general purpose computer to carry out this method.

In accordance with a still further aspect of the present invention there is provided a method of controlling gain in a distributed Raman amplifier, the distributed Raman amplifier includes a length of transmission fiber and a pump laser, the method includes generating a pump laser controlling current, amplitude modulating the pump laser controlling current to create a modulated pump laser controlling current and outputting the modulated pump laser controlling current to the pump laser of the distributed Raman amplifier. In another aspect of the invention a gain controller for a distributed Raman amplifier is provided for performing this method. In a further aspect of the present invention, there is provided a software medium that permits a general purpose computer to carry out this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
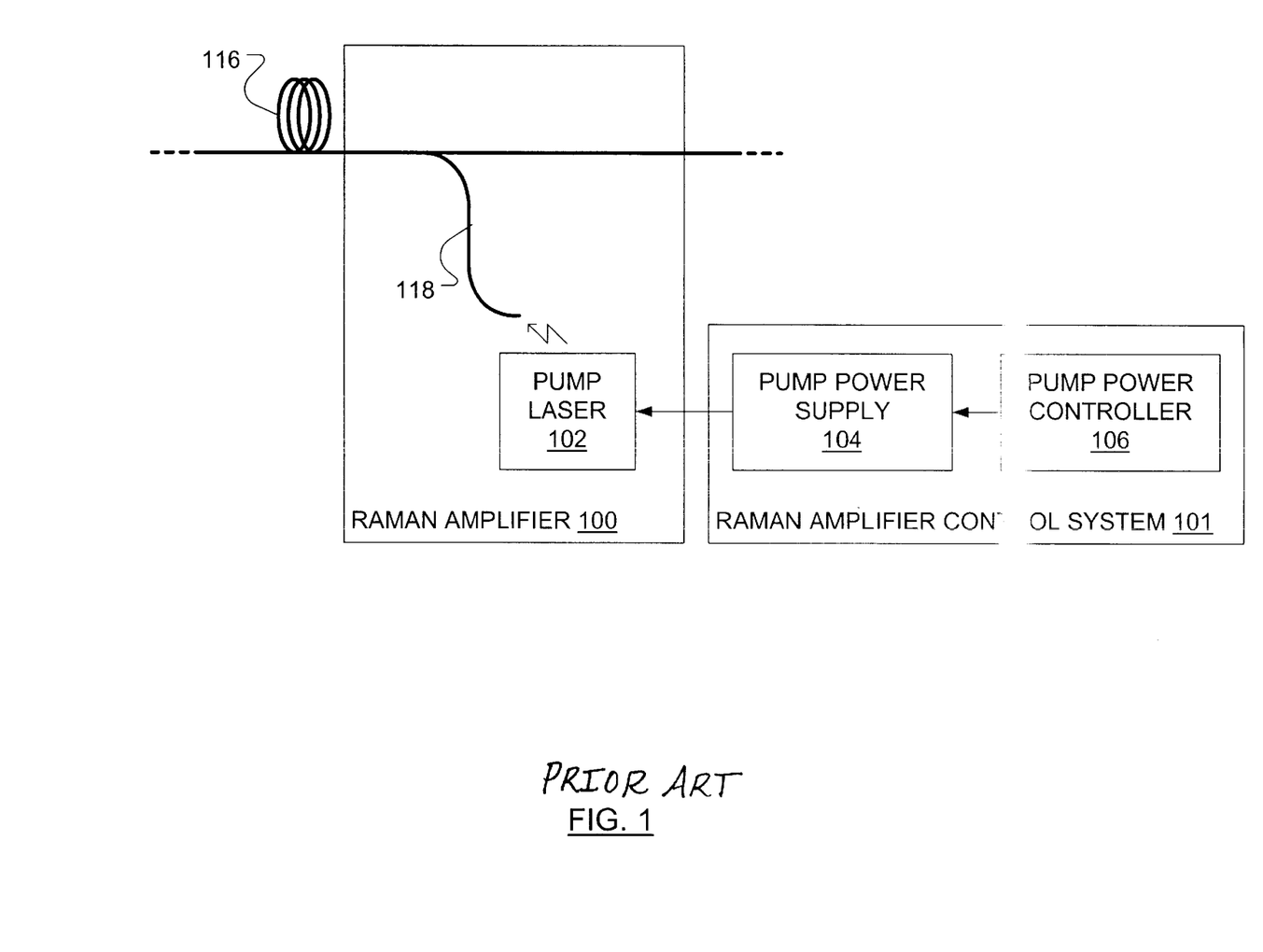
FIG. 1 schematically illustrates a typical distributed Raman amplification system.

Illustrated in FIG. 1 is a typical distributed Raman amplifier 100 and a Raman amplifier control system 101. The Raman amplifier 100, which includes a pump laser 102 and a stub 118, acts on a length of optical transmission fiber 116. The Raman amplifier control system 101 includes a pump power supply 104 under control of a pump power controller 106. The length of optical transmission fiber 116 may also be called a span and may be terminated at each end by an EDFA (not shown).

Figure 2:
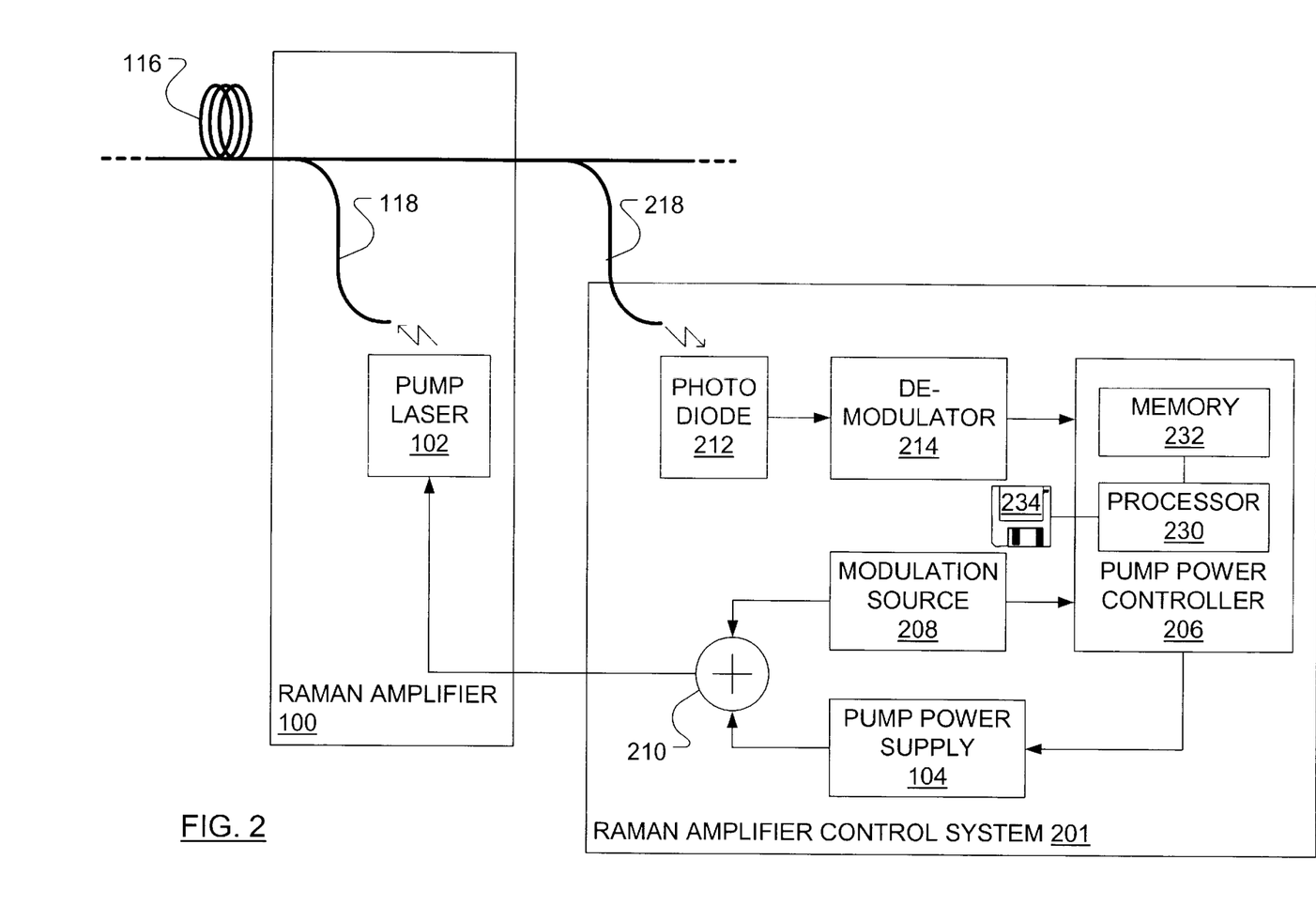
FIG. 2 schematically illustrates a distributed Raman amplification system according to an embodiment of the present invention.

Turning to FIG. 2, the Raman amplifier 100 remains as known, however a modified Raman amplifier control system 201 is introduced. The Raman amplifier control system 201 includes: a modulation source 208 for generating a modulation signal; the pump power supply 104; an adder 210 for summing the output of the pump power supply 104 and the output of the modulation source 208; a photodiode 212 for receiving an output optical signal from a tap coupler 218 of the optical transmission fiber 116; a de-modulator 214 for sensing the modulation on the output signal received by the photodiode 212; and a pump power controller 206 for receiving an indication of the modulation on the signal received from the optical transmission fiber 116 as well as an indication of the modulation added to the output of the pump power supply 104 from the modulation source 208. Output of the pump power controller 206, which includes a processor 230 and a memory 232, is used to control the pump power supply 104. The processor 230 may be loaded with Raman amplifier control software for executing methods exemplary of this invention from software medium 234 which could be a disk, a tape, a chip or a random access memory containing a file downloaded from a remote source.

Figure 4:
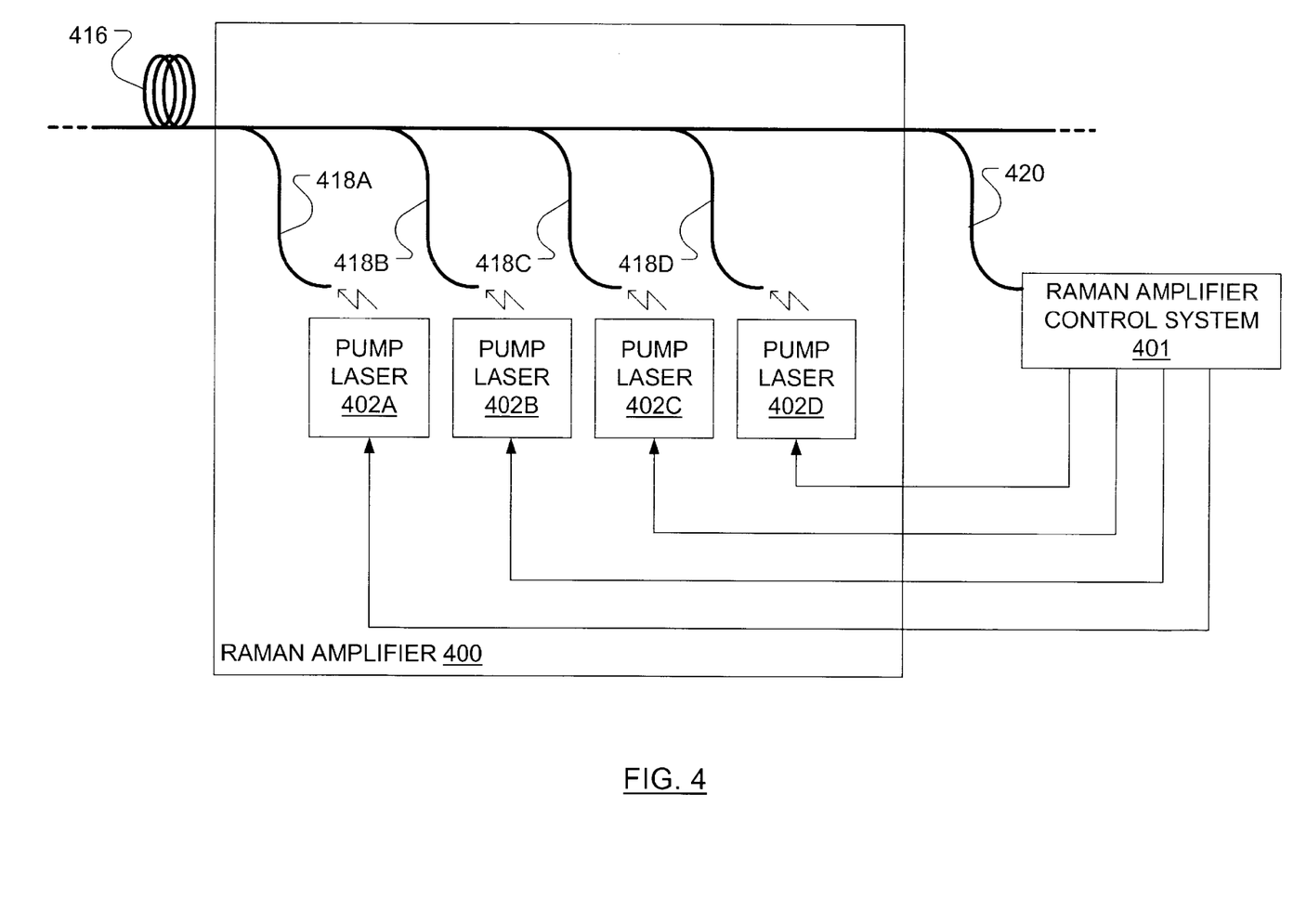
FIG. 4 schematically illustrates a distributed Raman amplification system for multiple wavelengths according to an embodiment of the present invention.

Control of a distributed Raman amplifier 400, which includes four pump lasers 402A, 402B, 402C, 402D, is illustrated in FIG. 4. Each of the pump lasers 402A, 402B, 402C, 402D may have a corresponding stub 418A, 418B, 418C, 418D through which to supply a transmission fiber 416 with energy. Alternatively, the output of the pump lasers 402A, 402B, 402C, 402D may be combined by a single combiner (not shown) before being introduced to the transmission fiber 416. The control is provided by the Raman amplifier control system 401, which receives an indication of the signal on the transmission fiber 416 via a tap coupler 420.

Figure 5:
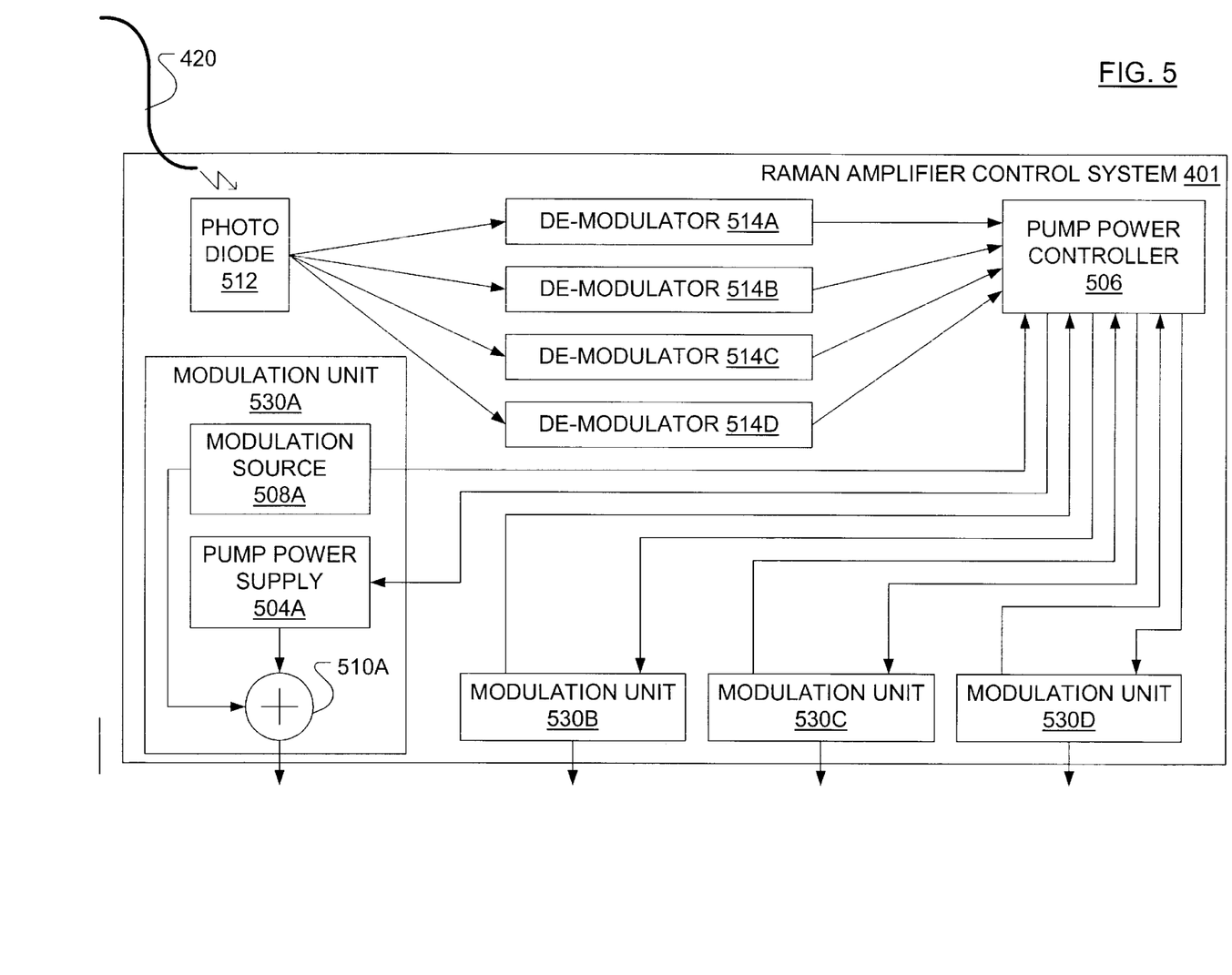
FIG. 5 schematically illustrates components of the Raman amplifier control system of FIG. 4 according to an embodiment of the present invention.

Components of the Raman amplifier control system 401 are illustrated in FIG. 5. Control is provided by a pump power controller 506 that receives input from a set of de-modulators 514A, 514B, 514C, 514D including a de-modulator corresponding to each pump laser under control. Each of the de-modulators 514A, 514B, 514C, 514D receives the same electrical signal from a photo diode 512, which receives an optical signal from the stub 420. A modulation unit 530A includes a pump power supply 504A, a modulation source 508A and an adder 510A to combine the output of the pump power supply 504A and the modulation source 508A. The pump power supply 504A is under control of the pump power controller 506 while the modulation source 508A reports a modulation level to the pump power controller 506. Each of a set of remaining modulation units 530B, 530C, 530D correspond to the remaining three pump lasers 402B, 402C, 402D and have a parallel structure to that of the modulation unit 530A corresponding to the pump laser 402A (FIG. 4).

In a typical distributed Raman amplification system, as illustrated in FIG. 1, the pump laser 102 provides laser light into the optical transmission fiber 116 of a fiber optic system. Typical pump laser wavelengths are 1425–1500 nm. The energy from the pump frequency is transferred to traffic wavelengths (typically between 1530–1603 nm) via the Raman effect. This provides a gain to the traffic wavelength that is distributed along the fiber. The power of the laser light provided into the optical transmission fiber 116 may be set by controlling current supplied to the pump laser 102. This controlling current is received by the pump laser 102 from the pump power supply 104 under control of a pump power controller 106. This is an open loop process with control provided by the Raman amplifier control system 101 for the pump power but not for the gain of the distributed Raman amplifier 100.

In overview, determination of characteristics of an optical signal on the optical transmission fiber 116 are facilitated by amplitude modulating a signal at the output of the pump laser 102 of the distributed Raman amplifier 100. This amplitude modulation allows the pump power controller 206 to determine the gain introduced by the distributed Raman amplifier 100. Given knowledge of this gain, the pump power controller 206 may provide closed loop control of the gain. The amplitude modulated signal also allows the Raman amplifier control system 201 to recognize changes in reflectivity of an end of the optical transmission fiber 116, and thus act as a reflectometer. Further, the amplitude modulation allows identification of a particular pump laser signal that, given knowledge of the transmitted power, allows a receiver to determine a power loss over the length of the optical transmission fiber 116.

In operation, the supply of power to the pump laser 102 is modulated with a small amount of amplitude modulation such that the pump laser signal is amplitude modulated. Preferably, the amplitude modulation is provided at a low frequency, say 10–1000 Hz. The frequency should be chosen to be low enough for efficient energy transfer. Notably, an EDFA at the end of a span on which a Raman amplifier is operating may block the amplitude modulation, allowing for reuse of the amplitude modulation frequency in the next span. This pump laser signal amplitude modulation transfers to the traffic wavelengths and is detected at the Raman amplifier control system 201 using the photodiode 212. The processor 230 in the pump power controller 206 receives an indication of the received modulation. The processor 230, given knowledge of the signal level of the modulation that was applied (from modulation source 208), may determine the gain provided by the distributed Raman amplifier 100. The pump power controller 206 then controls the power supplied to the pump laser 102 by the pump power supply 104 to give a specific gain, thus providing closed loop control.

Figure 3:
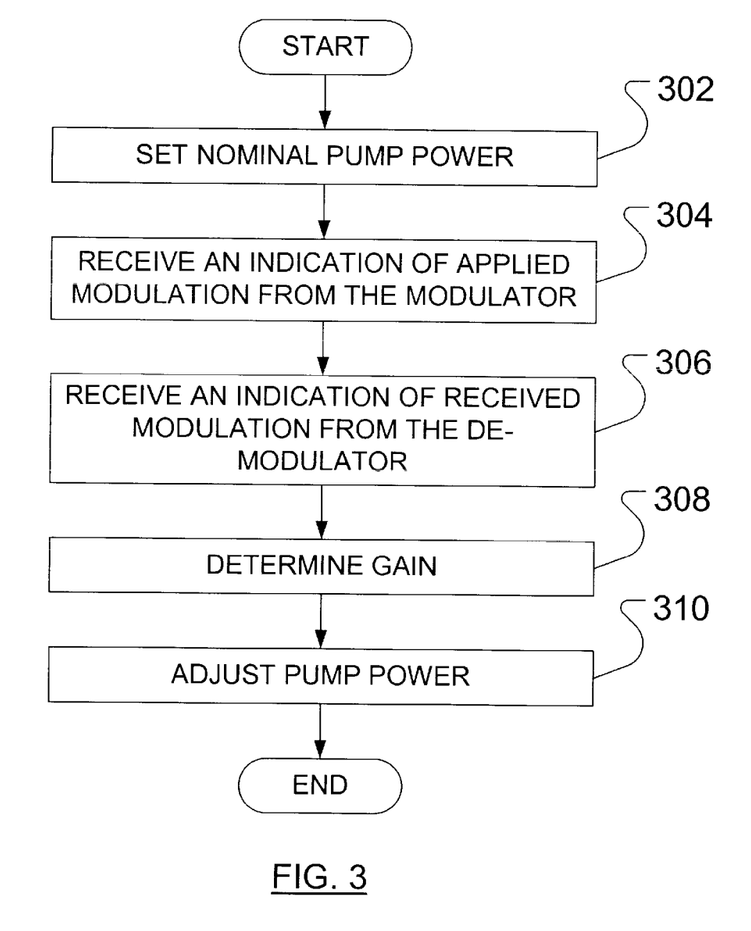
FIG. 3 illustrates, in a flow diagram, the steps of a method of controlling a distributed Raman amplifier.

The steps performed by the pump power controller 206 while controlling the distributed Raman amplifier 100 are outlined in FIG. 3. Initially, the pump power supply 104 is provided with a nominal value of pump power by the pump power controller 206 (step 302). The modulation source 208, as well as providing an applied modulation signal to the adder 210, provides an indication of the applied modulation signal to the pump power controller 206 (step 304). The photodiode 212 receives the optical signal at the output of the Raman amplifier 100 and converts it to an electrical signal. The de-modulator 214 extracts a received modulation signal from this electrical signal and provides an indication of the received modulation signal to the pump power controller 206 (step 306). Having received indications of both the applied modulation and the received modulation, the pump power controller 206 may then proceed to determine the gain for the distributed Raman amplifier 100 (step 308). Based on the gain determined in step 308 and a predetermined desired gain, the pump power controller 206 may adjust the value of pump power provided to the pump power supply 104.

As it is likely, especially when in use in WDM transmission systems, that the transmission fiber will carry multiple wavelengths (signal channels), control may be provided for amplification of each of the multiple wavelengths. As illustrated in FIG. 4, the distributed Raman amplifier 400 includes four pump lasers 402A, 402B, 402C, 402D, each under the control of the Raman amplifier control system 401. Turning to FIG. 5, to distinguish the modulation provided by the modulation source 508A in the modulation unit 530A, from the modulation provided by modulation sources in the other modulation units 530B, 530C, 530D, the modulation may be a combination of two or three frequencies. For instance, a scheme similar to that used to generate Dual Tone Multi-Frequency (DTMF) signals for conventional tone dialing telephones may be used to amplitude modulate the power provided by pump power supply 504A. This modulation scheme allows the de-modulator 514A to recognize the modulation provided by the modulation source 508A. Alternatively, the modulation may be coded to identify the modulation source 508A.

As will be apparent to a person skilled in the art, the de-modulators 514A, 514B, 514C, 514D may be implemented using signal processing techniques. In alternate modulation schemes the de-modulators 514A, 514B, 514C, 514D may be implemented to include tunable filters, each used to select a distinct wavelength, or may even be implemented to include a combination of a dispersive element and a detector array. The latter implementation may provide an indication of the mean power of the signal received from the optical transmission fiber 116 in addition to an indication of the power of the modulation at each wavelength.

Figure 6:
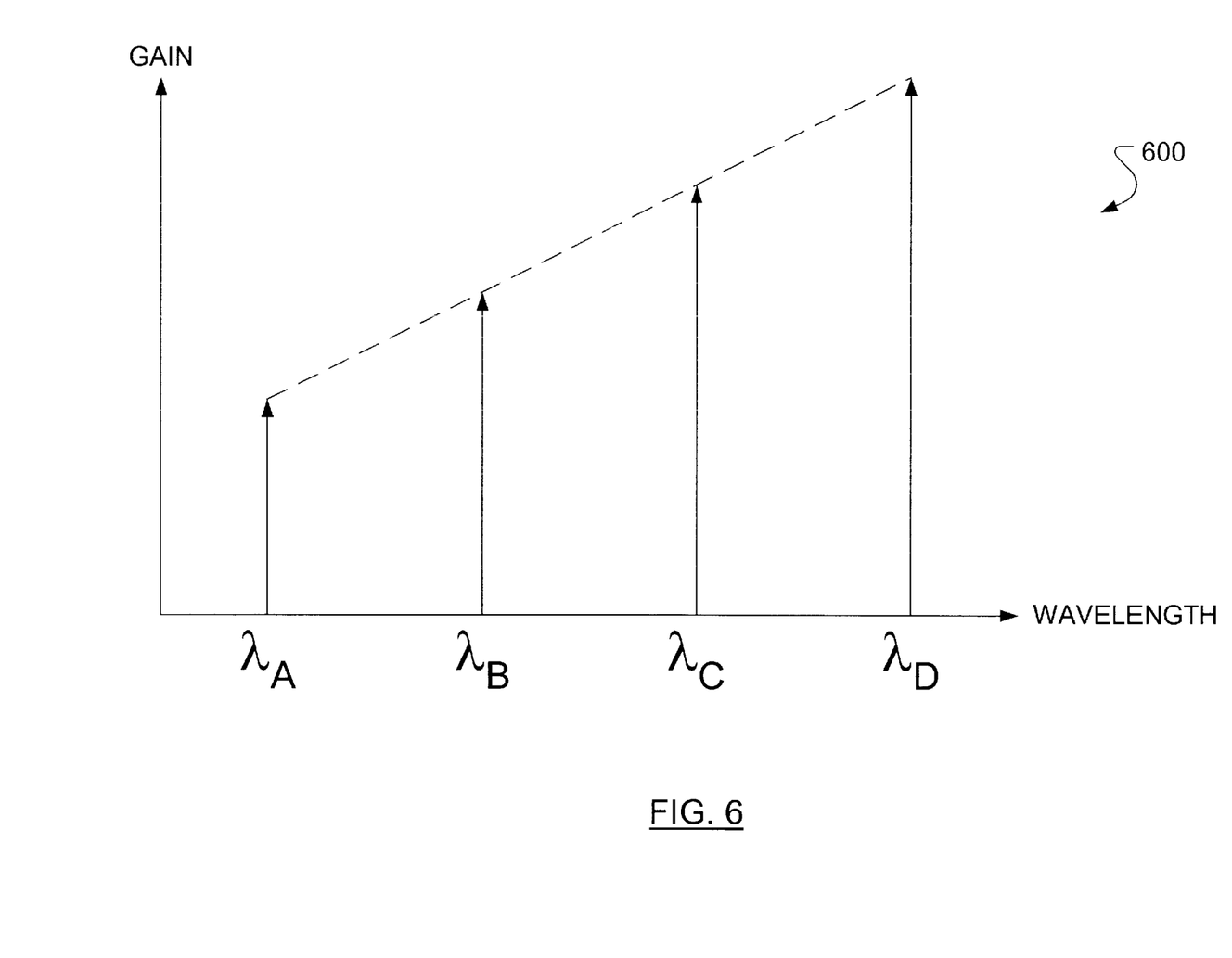
FIG. 6 graphically illustrates Raman gain tilt.

Under conventional control, say if a control system similar to the Raman amplifier control system 101 (FIG. 1) is used to control each of the four pump lasers, the Raman Effect may transfer disparate amounts of energy to traffic signals at different wavelengths, even with identical pump laser powers. The result of this disparity in energy transfer can lead to Raman induced gain tilt. Such a gain tilt is illustrated by a graphical representation 600 of gain vs. wavelength in FIG. 6, where traffic wavelengths are represented by $\lambda_A$, $\lambda_B$, $\lambda_C$ and $\lambda_D$. However, under control of Raman amplifier control system 401, the gain due to each pump laser 402A, 402B, 402C, 402D, can be identified and measured. Thus, the amount of gain tilt can also be measured, assessed and, if necessary, corrected through control of the gain applied to one or more of the traffic wavelengths.

We can define the amount of modulation on a given pump laser as $r_p$, which represents a ratio of root mean square (RMS) fluctuation of optical power on the pump laser due to the modulation $<\delta P_p^2>$ to the square of the mean optical pump power $<P_p>$:

$$r_p = \frac{\langle \delta P_p^2 \rangle}{\langle P_p \rangle^2}. \quad (1)$$

This is analogous to relative intensity noise (RIN). We can show that for a Raman amplifier, the amount of modulation on the signal on the optical transmission fiber ($r_s$) is given by:

$$r_s = \frac{\langle \delta P_s^2 \rangle}{\langle P_s \rangle^2} \quad (2)$$

$$= r_p \cdot (\ln(G_R))^2 \frac{\left(\frac{V_s}{L_{eff}}\right)^2}{(\alpha_p V_s)^2 + (4\pi f)^2} (1 - 2e^{-\alpha_p L}\cos(4\pi fT) + e^{-2\alpha_p L}), \quad (3)$$

where $\langle \delta P_s^2 \rangle$ is the root mean square (RMS) fluctuation, due to the modulation, of optical power of the signal on the optical transmission fiber, $\langle P_s \rangle$ is the mean optical power of the signal on the optical transmission fiber, $G_R$ is the amount of Raman gain provided by a pump laser with amplitude modulation at frequency f, $V_s$ is the group velocity at the signal wavelength, $\alpha_p$ is the attenuation of the fiber at the pump laser wavelength (in neper/km), L is length of the fiber, T is the transit time of the fiber and $L_{eff}$ is the effective length of the fiber:

$$L_{eff} = \frac{1 - e^{-\alpha_p L}}{\alpha_p}. \quad (4)$$

If the fiber is long (this will be the case for most long-haul transmission systems), then equation 3 may be approximated as:

$$r_s = r_p \cdot (\ln(G_R))^2 \frac{\left(\frac{V_s}{L_{eff}}\right)^2}{(\alpha_p V_s)^2 + (4\pi f)^2}. \quad (5)$$

It can be seen from equation 5 that the transfer function of the modulation from the pump laser signal to the signal will be a low pass filter. For typical fiber characteristics, the low frequency roll-off is at about 1 kHz. The frequency of the amplitude modulation may therefore be selected from a range extending from about 10 Hz to about 1000 Hz.

Therefore, by knowing the modulation depth of the amplitude modulation placed on a particular pump laser wavelength (giving $r_p$), and by measuring the modulation depth of the modulation transferred to a given signal channel (giving $r_s$), the amount of linear gain ($G_R$) provided by that pump laser can be found by:

$$G_R = \exp\left(\sqrt{\frac{r_s(\alpha_s V_s)^2 + (4\pi f)^2}{r_p\left(\frac{V_s}{L_{eff}}\right)^2}}\right). \quad (6)$$

By measuring the modulation depth ($r_s$) for each signal channel, the relative amount of gain given by each pump laser to each signal channel can be determined.

The gain ($G_{Ri}$) given to a signal at wavelength $\lambda_s$ by the ith pump laser, where there are a total of N pump lasers, with modulation at individual frequency $f_i$, is given by:

$$G_{Ri}(\lambda_s) = \exp\left(\sqrt{\frac{r_s(\alpha_s V_s)^2 + (4\pi f_i)^2}{r_p\left(\frac{V_s}{L_{eff}}\right)^2}}\right). \quad (7)$$

The total Raman gain experienced by the signal is the sum of the gains from each pump laser:

$$G_{R\_total} = \sum_{i=1}^{N} G_{Ri}. \quad (8)$$

The total gain for each signal channel is useful in order to optimize the relative pump powers so as to create an optimum gain spectrum. It is also useful to know the gain contribution that each pump laser makes towards the total gain shape so that the control routine can be appropriately optimized.

Additionally, the Raman amplifier control system 201 may be able monitor aspects of the optical transmission fiber 116 other than gain. For instance, an increase in the amount of the amplitude modulation received by de-modulator 214, without a corresponding increase in the modulation supplied by modulation source 208, may signify an increase in reflection caused by optical components at the far end of the optical transmission fiber 116. Thus, the Raman amplifier control system 201 may be seen as acting as a reflectometer. Alternately, given an approximation for the amount of reflection received under normal conditions, the power supplied to the pump laser 102 may be shut off if the amount of reflection surpasses a threshold. Such a high amount of reflection may be an indication of a dirty connector, a fiber break or mismatch.

It may be that the generation of a particular pump laser signal, including addition of coded amplitude modulation to the current supplied by a pump power supply for a pump laser, is performed at one end of a fiber span and the receipt of the particular pump laser signal occurs at the other end of the fiber span. The coded amplitude modulation allows the receiving end to identify the particular pump laser signal. The receiving end can then determine the power in this signal. An optical service channel could be used to indicate to the receiving end the amount of power supplied to the pump laser. Given the amount of power supplied to the pump laser and the amount of received power, an amount of power loss associated with the fiber may be determined.

As will be appreciated, the method of amplitude modulating the pump laser signal at the output of the pump laser 102 of the distributed Raman amplifier 100 need not be limited to controlling current supplied to the pump laser 102. For instance, the pump laser signal may be amplitude modulated, after being generated by the pump laser 102, by a lens with controllable transmittance.

Other modifications will be apparent to those skilled in the art and, therefore, the invention is defined in the claims.

We claim:

1. A method for facilitating determination of a characteristic of an optical signal on an optical fiber, comprising:
   amplitude modulating a pump laser signal of a distributed Raman amplifier with an introduced amount of amplitude modulation; and
   monitoring a gain provided by said distributed Raman amplifier where said monitoring comprises:
   determining a received amount of amplitude modulation of said optical signal; and determining said gain from said introduced amount of amplitude modulation and said received amount of amplitude modulation.

2. The method of claim 1 where said monitoring further comprises, for a given introduced amplitude modulation, interpreting any increase in said gain as signifying an increase in reflection at a far end of said optical fiber.

3. The method of claim 1 wherein said method further comprises:

identifying said pump laser signal from amplitude modulation applied through said amplitude modulating;

measuring a power of said pump laser signal to result in an indication of received power;

receiving an indication of transmitted power; and determining a power loss over said optical fiber from said indication of received power and said indication of transmitted power.

4. The method of claim 1 further comprising sending an indication of power of said pump laser signal.

5. A method for facilitating determination of a characteristic of a received optical signal on an optical fiber, comprising:

identifying a particular pump laser signal of a distributed Raman amplifier, as a component of said received optical signal, from amplitude modulation of said particular pump laser signal;

measuring a power of said particular pump laser signal;

receiving an indication of transmitted power in said particular pump laser signal; and determining a power loss from said indication of transmitted power and a power determined from said measuring said power of said particular pump laser signal.

6. A method of monitoring gain in a distributed Raman amplifier, said distributed Raman amplifier comprising a length of transmission fiber and a pump laser, said method comprising:

receiving an indication of amplitude modulation applied to a pump laser signal of said distributed Raman amplifier;

receiving an indication of amplitude modulation output from said distributed Raman amplifier; and determining a gain from said indication of amplitude modulation applied and said indication of amplitude modulation output.

7. The method of claim 6 further comprising:

setting a pump power for said pump laser to a nominal value; and based on said gain, adjusting said pump power.

8. The method of claim 6 wherein said indication of amplitude modulation applied is received directly from a modulation source.

9. The method of claim 6 wherein said indication of amplitude modulation applied is received from a modulation source via an optical service channel.

10. The method of claim 6 wherein said indication of amplitude modulation applied is a first indication of amplitude modulation applied to a first pump laser signal, said indication of amplitude modulation output is a first indication of amplitude modulation output and said gain is a first gain, said method further comprising:

receiving a second indication of amplitude modulation applied;

receiving a second indication of amplitude modulation output from a second de-modulator;

determining a second gain from said second indication of amplitude modulation applied and said second indication of amplitude modulation output;

determining a gain tilt from said first gain and said second gain.

11. The method of claim 10 further comprising adjusting a power supplied to said first pump laser to reduce said gain tilt.

12. The method of claim 6 wherein said gain is a first gain and said method further comprises, after a delay:

determining a second gain;

determining a gain difference from said first gain and said second gain; and based on said gain difference, recognizing an increase in reflection at an end of said length of transmission fiber.

13. A gain monitoring system for a distributed Raman amplifier, said distributed Raman amplifier comprising a length of transmission fiber and a pump laser, said control system comprising:

a pump power supply for supplying power to said pump laser;

a modulation source;

an adder for producing a sum signal that is a sum of an output of said pump power supply and an output of said modulation source and providing said sum signal to said pump laser;

a photodiode for converting an optical signal from said length of transmission fiber to a representative electrical signal;

a de-modulator for extracting an indication of modulation from said representative electrical signal;

a pump power controller operable to:
receiving an indication of said output of said modulation source;
receiving said indication of modulation extracted from said representative electrical signal by said de-modulator; and
determining a gain from said indication of said output of said modulation source and said indication of modulation extracted.

14. A pump power controller operable to:

receive an indication of amplitude modulation applied to a pump laser signal of a distributed Raman amplifier;

receive an indication of amplitude modulation output from said distributed Raman amplifier; and determine a gain from said indication of amplitude modulation applied and said indication of amplitude modulation output.

15. A pump power controller comprising:

means for receiving an indication of amplitude modulation applied to a pump laser signal of a distributed Raman amplifier;

means for receiving an indication of amplitude modulation output from said distributed Raman amplifier; and means for determining a gain from said indication of amplitude modulation applied and said indication of amplitude modulation output.

* * * * *